United States Patent [19]
Libby

[11] Patent Number: 5,901,725
[45] Date of Patent: May 11, 1999

[54] COMBINATION STAND AND SHELTER FOR BICYCLES

[76] Inventor: Michael Libby, 15723 Ambiance Dr., Gaithersburg, Md. 20878

[21] Appl. No.: 08/775,804

[22] Filed: Dec. 31, 1996

[51] Int. Cl.[6] .................................................. E04H 15/06
[52] U.S. Cl. .................................. 135/88.06; 135/88.09; 135/96; 135/117
[58] Field of Search ............................. 135/88.03, 88.06, 135/88.09, 88.17, 88.18, 96, 117, 901, 902; 211/17, 22

[56] References Cited

U.S. PATENT DOCUMENTS

| | | | |
|---|---|---|---|
| 587,569 | 8/1897 | Ehmann . | |
| 594,057 | 11/1897 | Youngman . | |
| 1,853,742 | 4/1932 | Owen et al. . | |
| 1,918,523 | 7/1933 | Dyer et al. . | |
| 2,097,923 | 11/1937 | Hutchinson . | |
| 2,533,683 | 12/1950 | Neuhaus | 135/96 X |
| 3,009,166 | 11/1961 | Sears | 135/96 X |
| 3,743,345 | 7/1973 | Eckman et al. | 135/117 X |
| 3,744,195 | 7/1973 | Ferkich | 135/117 X |
| 3,812,616 | 5/1974 | Koziol | 135/117 X |
| 3,893,466 | 7/1975 | Barker | 135/117 X |
| 4,067,347 | 1/1978 | Lipinski | 135/901 X |
| 4,834,128 | 5/1989 | Burgess . | |
| 4,991,612 | 2/1991 | Kiss et al. . | |
| 5,446,580 | 8/1995 | Collins | 135/117 X |
| 5,564,784 | 10/1996 | Felling | 135/96 X |

FOREIGN PATENT DOCUMENTS

| | | | |
|---|---|---|---|
| 0565497 | 10/1993 | European Pat. Off. | 135/902 |
| 3732522 | 4/1989 | Germany | 211/17 |

*Primary Examiner*—Lanna Mai
*Attorney, Agent, or Firm*—Shoemaker and Mattare, Ltd.

[57] ABSTRACT

A combination stand and shelter for bicycles includes an anchored shelter made of two side members interconnected by a frame which also serves as a bike stand. A stiff sheet captured between the side members provides a weather shield for the front wheel of the bicycle, and also houses a storage bin for tools and spares. The rear portion of the bike may be covered, when desired, by drawing a flexible cover from a reel within the shelter, and securing its free end to the rear of the vehicle.

2 Claims, 3 Drawing Sheets

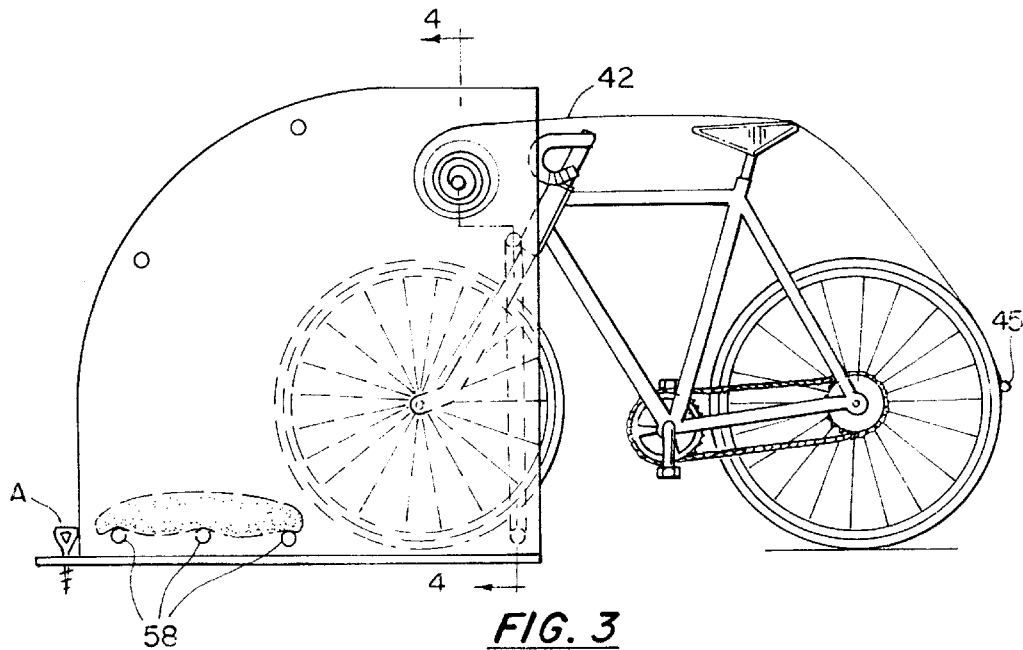
FIG. 3
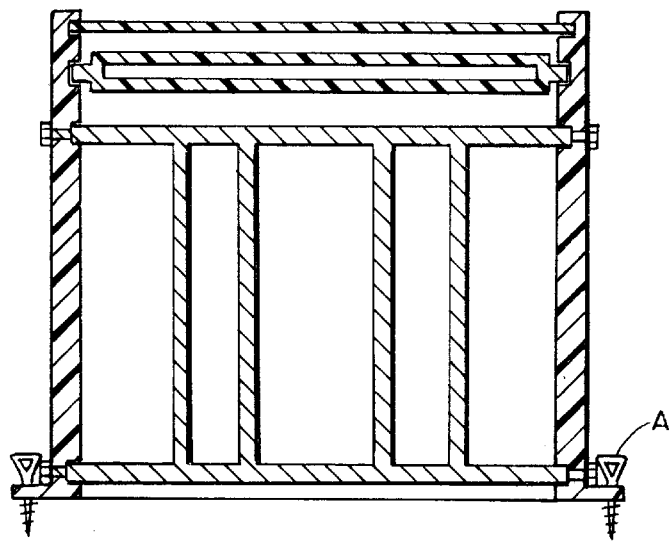
FIG. 4
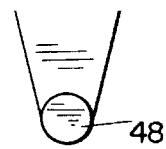

COMBINATION STAND AND SHELTER FOR BICYCLES

BACKGROUND OF THE INVENTION

This invention relates generally to bicycles, and more particularly to a combination stand and shelter for bicycles.

Cyclists often have to store their bicycles outside. When they do, rain can rapidly rust the bicycle's components, particularly the chain. Exposed bicycles are also good targets for theft and vandalism.

Garaging a bicycle protects it from the weather, thieves and vandals, but a garage or shed is in many cases not available. Besides, bicycles consume large volumes in a garage, unless very carefully stowed.

It would be useful to have a combination shelter and bike stand that could be quickly set up and installed anywhere, and whose function would be dedicated just to bicycle storage.

Prior inventors have proposed various devices for protecting vehicles, including bicycles. U.S. Pat. No. 1,918,523, for example, discloses a vehicle cover which is stored on a reel affixed above the rear bumper of the vehicle. A length of material is drawn from the reel, over the front of the car, and then is secured to the rear bumper. Wings on either side of the material can be folded out, once the cover is withdrawn, so that they drape over the sides of the car. Other reel-type vehicle covers are shown in U.S. Pat. Nos. 4,991,612; 4,834,128; and 2,097,923.

Prior covers designed specifically for bicycles have typically been affixed to and carried on the vehicle. U.S. Pat. Nos. 587,569; 594,057 and 1,853,742 are representative. The obvious difficulty with such arrangements is their bulk and weight. Modern cyclists, obsessive about these factors, would reject such an approach.

SUMMARY OF THE INVENTION

An object of the invention is to protect bicycles from the weather.

Another object of the invention is to facilitate erection of a bicycle shelter at any location.

A further object of the invention is to minimize the size, weight and cost of a portable bicycle shelter.

These and other objects are attained by a combination stand and shelter for bicycles including a shelter which may be anchored to the ground, and a frame which reinforces the shelter and also serves as a bicycle stand.

BRIEF DESCRIPTION OF THE DRAWINGS

In the accompanying drawings,

FIG. 3 is a view like FIG. 1, of a modified form of the invention;

FIG. 4 is a sectional view thereof, taken on the plane 4—4 in FIG. 3;

DESCRIPTION OF THE PREFERRED EMBODIMENT

Figure 2:
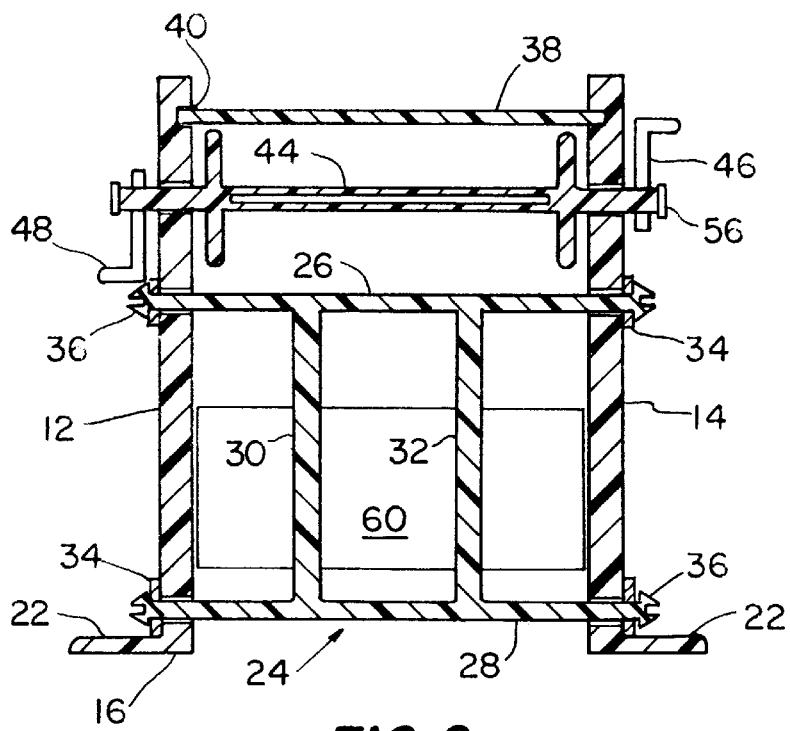
FIG. 2 is a sectional view thereof, taken on the plane 2—2 in FIG. 1.
Figure 5:
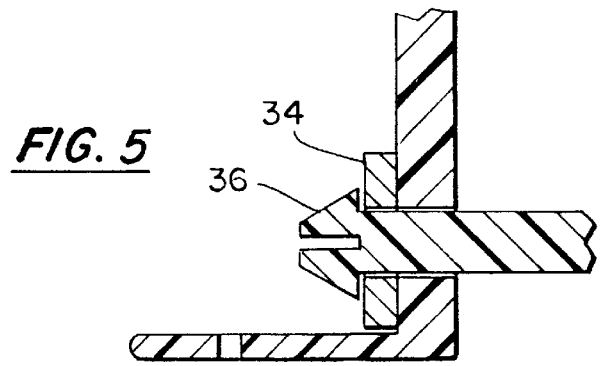
FIG. 5 is a detail of a portion of FIG. 4.

A combination stand and shelter for bicycles embodying the invention includes a shelter 10 formed from a pair of vertical side members 12,14, each having a horizontal edge 16 at ground level, a vertical edge 18, and an arcuate upper edge 20. The side members are preferably molded from a polymeric material such as polyurethane, and may have a foam core to provide adequate thickness while minimizing material weight and cost. Each bottom edge has a flange 22 formed along it, or subsequently attached, to provide means for anchoring the side members to the ground. The flanges extend outward, away from one another, as can be seen in FIG. 2.

Figure 1:
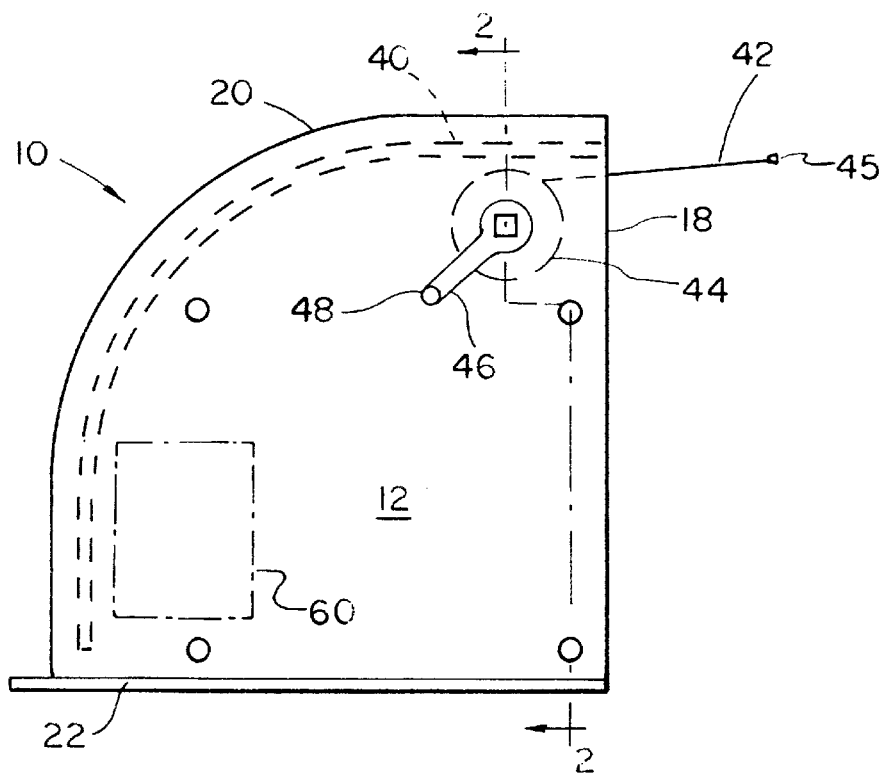
FIG. 1 is a side elevation of a combination stand and shelter for bicycles embodying the invention.

The side members are structurally interconnected by a frame 24, which preferably is blow molded. It comprises integral top and bottom rails 26,28, and two or more vertical rungs 30,32 defining openings into which the front wheels of bicycles may be inserted. The ends of the top and bottom rails, in FIGS. 1 and 2, extend through holes in the side members, where they are retained by washers 34 which are pushed over the barbed ends 36 of the rails, after a stiff top plastic sheet 38 has been installed in grooves 40 which run parallel to the arcuate upper edge 20 of their respective side members.

The side members and top sheet together form an open shelter against wind and rain, but the shelter encloses only a portion of the front wheel of a bicycle parked in the frame. The remainder of the bicycle may be covered by withdrawing from the shelter a flexible cover 42 made of fabric or extruded water-proof material, which is wound on a reel 44. The reel is best seen in FIG. 2. The cover has a rigidifying pull handle 45 at its free end, with means for attaching the cover to the rear of the bicycle. The cover should have some stiffness, both for the sake of appearance, and to protect the bicycle from blowing rain. A polyethylene sheet fifty mils thick is presently preferred; however, it is expected that other materials may prove useful, or even superior.

Figure 6:
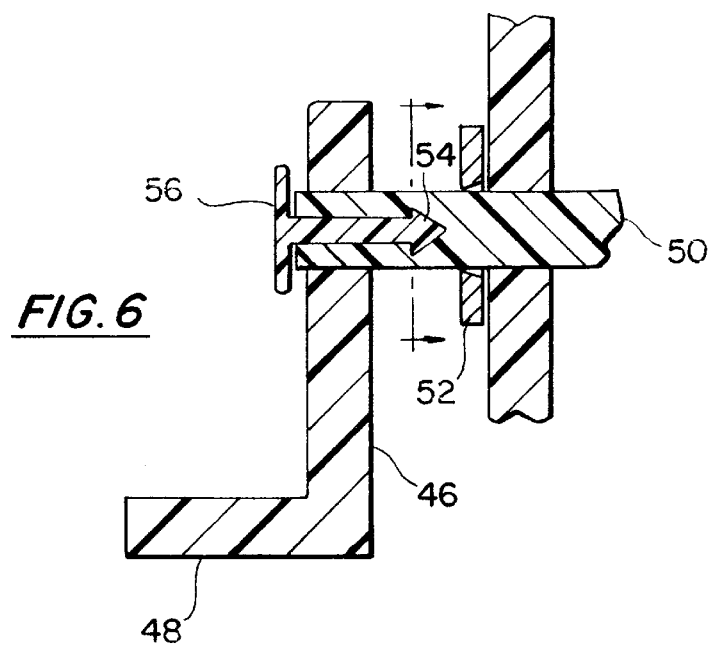
FIG. 6 is a detail of another portion of FIG. 4.
Figure 7:
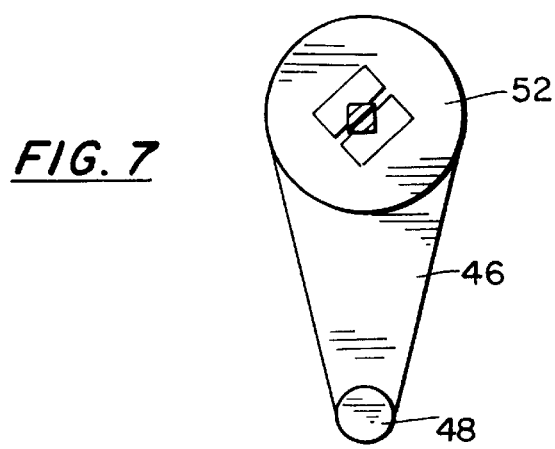
FIG. 7 is a side elevation of the crank shown in FIG. 6.

To rewind the cover onto the reel, there is at least one, preferably two, cranks 46, having handles 48. The cranks are installed on the ends of the reel shaft 50, which ends have a non-circular (e.g., square) cross section corresponding to that of the holes in the cranks, so that torque can be transmitted. As FIG. 6 shows, the ends of the reel shaft are split lengthwise, and extend through holes in the side members, where they are retained by washers 52 and barbs 54 similar to those described for the rail ends. The cranks are retained by pins 56 having barbed ends which push into holes in the ends of the shaft and lock into conforming recesses at the bottoms of the holes, as shown in FIGS. 6 and 7. The barbed connections are designed for one-way assembly, so as to resist disassembly by vandals. However, one could easily change the geometry of the barbs to permit the unit to be knocked down, so that it could be transported.

An alternative form of the reel is shown in FIG. 4. Here, the cranks are omitted, and instead a reel containing a torsion spring, as in a window shade, is employed. Tabs at the ends of the reel core are received in slots in the sides of the unit, to prevent the core from turning. Details of the mechanism are not shown, being conventional.

After the shelter is assembled, it is placed on the ground (preferably directed into prevailing winds), and securing it by driving anchors "A" through holes in the flanges, into the ground. Where this is impossible, or where anchors do not provide adequate hold-down strength, it may be necessary to ballast the unit. For this reason, I prefer to provide at least two rods 58 (FIG. 3) extending widthwise between the forward ends of the bottom edges of the side members. A bag of sand or lime, or other heavy objects, may be placed on the rods for ballast.

It is also contemplated to provide a lockable storage bin 60 (FIG. 1) within the shelter, for tools, helmets and the like.

Although the preferred frame is molded from plastic, one might alternatively construct the frame by welding together metal tubes. An aluminum tube frame is shown in FIG. 4, secured in blind holes in the side members by bolts.

One might also include a torsion spring within or around the reel shaft to rewind the cover.

Since the invention is subject to these and other modifications and variations, it is intended that the foregoing description and the accompanying drawings shall be interpreted as only illustrative of the invention defined by the following claims.

I claim:

1. A combination stand and shelter for bicycles, comprising a shelter having an open end for receiving one wheel of a bicycle, a frame for reinforcing the shelter and also serving as a bike stand, and a flexible cover wound on a reel contained within the shelter whereby the cover can be drawn from the reel over a rear portion of a bicycle situated in the stand, wherein the shelter comprises two vertical side members interconnected by said frame, and a weatherproof stiff top sheet secured between the side members and wherein the frame has top and bottom rails interconnected by vertical rungs, and the ends of each rail pass through holes in the side members, where they are secured by fasteners.

2. The invention of claim 1, wherein the fasteners comprise tapered-bore washers which are pushed barbs on the ends of the rails.

* * * * *